(12) United States Patent
McAlinden et al.

(10) Patent No.: US 8,113,465 B2
(45) Date of Patent: Feb. 14, 2012

(54) TRAILING EDGE AIRCRAFT STRUCTURE WITH OVERHANGING COVER

(75) Inventors: Jon McAlinden, Bristol (GB); Kim Sharp, Bristol (GB)

(73) Assignee: Airbus UK Limited, Bristol (GB)

( * ) Notice: Subject to any disclaimer, the term of this patent is extended or adjusted under 35 U.S.C. 154(b) by 550 days.

(21) Appl. No.: 12/370,637

(22) Filed: Feb. 13, 2009

(65) Prior Publication Data

US 2009/0218442 A1 Sep. 3, 2009

(30) Foreign Application Priority Data

Feb. 29, 2008 (GB) .................................. 0803689.9

(51) Int. Cl.
*B64C 1/00* (2006.01)
(52) U.S. Cl. .................................................... 244/123.1
(58) Field of Classification Search ............... 244/123.1, 244/123.14, 123.7, 123.8, 124, 131, 99.2, 244/90 R
See application file for complete search history.

(56) References Cited

U.S. PATENT DOCUMENTS

| | | | |
|---|---|---|---|
| 3,706,430 A * | 12/1972 | Kline et al. ................. | 244/35 R |
| 4,618,109 A * | 10/1986 | Victor .......................... | 244/130 |
| 4,652,036 A * | 3/1987 | Okamoto et al. .......... | 296/180.1 |
| 4,749,155 A | 6/1988 | Hammer et al. | |
| 5,110,072 A | 5/1992 | Owl et al. | |
| 5,224,670 A * | 7/1993 | Padden ....................... | 244/123.3 |
| 7,244,487 B2 * | 7/2007 | Brantley et al. ............... | 428/119 |
| 7,770,846 B2 * | 8/2010 | Rodriguez et al. ........... | 244/209 |
| 7,837,148 B2 * | 11/2010 | Kismarton et al. ......... | 244/123.1 |
| 7,871,041 B2 * | 1/2011 | Brice et al. ................. | 244/123.7 |
| 7,875,333 B2 * | 1/2011 | Stephan ....................... | 428/60 |

FOREIGN PATENT DOCUMENTS

| | | |
|---|---|---|
| EP | 0239138 A2 | 9/1987 |
| EP | 0947421 A1 | 10/1999 |
| GB | 851379 | 10/1960 |
| SU | 1420823 A1 | 9/1996 |
| WO | 8501489 A1 | 4/1985 |
| WO | 2006067403 A1 | 6/2006 |
| WO | 2007096624 A2 | 8/2007 |

OTHER PUBLICATIONS

British Search Report for GB0803689.9 Dated May 27, 2008.

* cited by examiner

*Primary Examiner* — Richard Price, Jr.
(74) *Attorney, Agent, or Firm* — Lowe, Hauptman, Ham & Berner, LLP

(57) ABSTRACT

An aircraft structure comprising: a rear spar; and a composite cover attached to the rear spar and having an overhanging portion extending to its rear. The overhanging portion of the cover comprises one or more ramps along which the thickness of the cover reduces. A second cover is attached to the rear spar and overhangs to its rear. A hinge rib is attached to one or both of the covers, and an aerodynamic control element such as an aileron, rudder or elevator is pivotally mounted to the hinge rib.

16 Claims, 5 Drawing Sheets

TRAILING EDGE AIRCRAFT STRUCTURE WITH OVERHANGING COVER

RELATED APPLICATIONS

The present application is based on, and claims priority from, British Application Number 0803689.9, filed Feb. 29, 2008, the disclosure of which is hereby incorporated by reference herein in its entirety.

FIELD OF THE INVENTION

The present invention relates to an aircraft structure comprising: a rear spar; and a composite cover attached to the rear spar and having an overhanging portion extending to its rear.

BACKGROUND OF THE INVENTION

Traditionally on large subsonic passenger aircraft, metallic or composite upper panels cover the trailing edge of the wing, aft of the rear spar. These panels are attached to the trailing edge ribs by bolts that pass through the panels and the trailing edge ribs. Each panel also requires an attachment to the wing cover (also known as a wing skin), traditionally via a series of butt straps that will connect both panel and wing cover. Each butt strap and panel will require multiple bolts.

This traditional arrangement brings a number of problems. Firstly, in order to minimise weight, both the wing cover and trailing edge ribs will be optimised and accordingly any variations in panel and rib thickness will be taken up by differing bolt grip lengths. All bolts will be countersunk and due to tolerancing there may be either a raised or recessed countersunk head that will contribute to overall aerodynamic drag. Secondly, the panels tend to introduce a span-wise and chord-wise step or discontinuity in the profile of the wing, increasing drag. Thirdly, there is a large part count and hence high manufacturing costs (on each panel there may be more than fifty bolts, and the number of panels may be in excess of twenty). Fourthly, each panel requires a significant amount of tooling and setting up time to ensure that the trailing edge ribs and the panels will be interchangeable between aircraft. Fifthly, each panel is typically manufactured from a carbon monolithic honeycomb construction to minimise the panel weight. The panel design is tailored to suit the air loads and accommodate stresses due to sympathetic wing bending. If the wing cover is metallic and the panel composite there will also be a requirement to consider differential thermal expansion between the different materials. Finally, the limited size and strength of the so-called "cover overhang" (that is, the portion of the cover which overhangs to the rear of the spar) means that it is not capable of reacting a significant amount of the load from aerodynamic control elements (such as ailerons or spoilers) mounted on the trailing edge of the wing.

SUMMARY OF THE INVENTION

A first aspect of the invention provides an aircraft structure comprising: a rear spar; and a composite cover attached to the rear spar and having an overhanging portion extending to its rear; wherein the overhanging portion of the cover comprises one or more ramps along which the thickness of the cover reduces.

The first aspect of the invention enables the cover to be extended aft to a greater extent than in conventional designs, enabling the panel to be made smaller or omitted completely. By ramping down the thickness of the cover in a span-wise and/or chord-wise direction, weight is minimised.

The ramp(s) may occupy the full area of the cover, or more typically only part of the area (the remaining area having a substantially constant thickness).

Typically the structure further comprises an aerodynamic control element (such as a flap, spoiler, aileron, elevator or rudder); and a hinge rib which is attached to the overhanging portion of the cover (and optionally also to the rear spar) and pivotally connected to the aerodynamic control element. The hinge rib may be attached to an area of the cover having a substantially constant thickness, for instance between a pair of span-wise ramps.

The hinge rib may be attached to one cover only, or more typically the hinge rib is also attached to the overhanging portion of a second cover. In this case the hinge rib may comprise a continuous web, or more preferably a first hinge rib arm which is attached to the overhanging portion of the first cover; and a second hinge rib arm which is attached to the overhanging portion of the second cover, and typically extends longitudinally at an acute angle to the first hinge rib arm.

A second aspect of the invention provides an aircraft structure comprising: a rear spar; a composite cover which is attached to the rear spar and overhangs to its rear; a second cover which is attached to the rear spar and overhangs to its rear; a hinge rib which is attached to the composite cover but not to the second cover; and an aerodynamic control element pivotally mounted to the hinge rib.

A third aspect of the invention provides a method of transferring load from an aerodynamic control element into an aircraft structure, the aircraft structure comprising a rear spar, a composite cover which is attached to the rear spar and has an overhanging portion extending to its rear, and a hinge rib which is attached to the overhanging portion of the cover and pivotally connected to the aerodynamic control element, the method comprising transferring more load from the hinge rib into the overhanging portion of the cover than into the rear spar.

In the second and third aspects of the invention, the composite cover may contain one or more ramps (as in the first aspect) or may have continuous thickness.

An advantage of transferring a higher proportion of the load into the composite cover is that significant weight savings can be achieved in the design of the hinge rib. It may also be possible to reduce the thickness of the overhanging portion of the second cover as it is no longer required to absorb as much load. This would lead to further weight savings.

The following comments apply to all aspects of the invention.

As a consequence of the fact that the composite cover can extend further aft than in conventional designs, the hinge rib may have a first portion in contact with the composite cover and a second portion in contact with the rear spar which has a smaller surface area than the first portion (and is also attached by fewer fasteners, in the case where fasteners are used).

Typically the overhanging portion of the cover has a trailing edge which is closer to the aerodynamic control element than it is to the rear spar. The trailing edge may be immediately adjacent to the control element (in which case no panel is required) or optionally a metallic strip could be placed in a gap between the cover and the control element, for stability or as a lightening diverter.

Most typically the structure comprises an aerofoil such as a main wing element or horizontal tail plane. Alternatively the structure may comprise a vertical tail plane or any other element of an aircraft.

The aerodynamic control element may comprise a flap, spoiler, aileron, elevator, rudder, or any other control element pivotally attached to the trailing edge of an aircraft structure.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
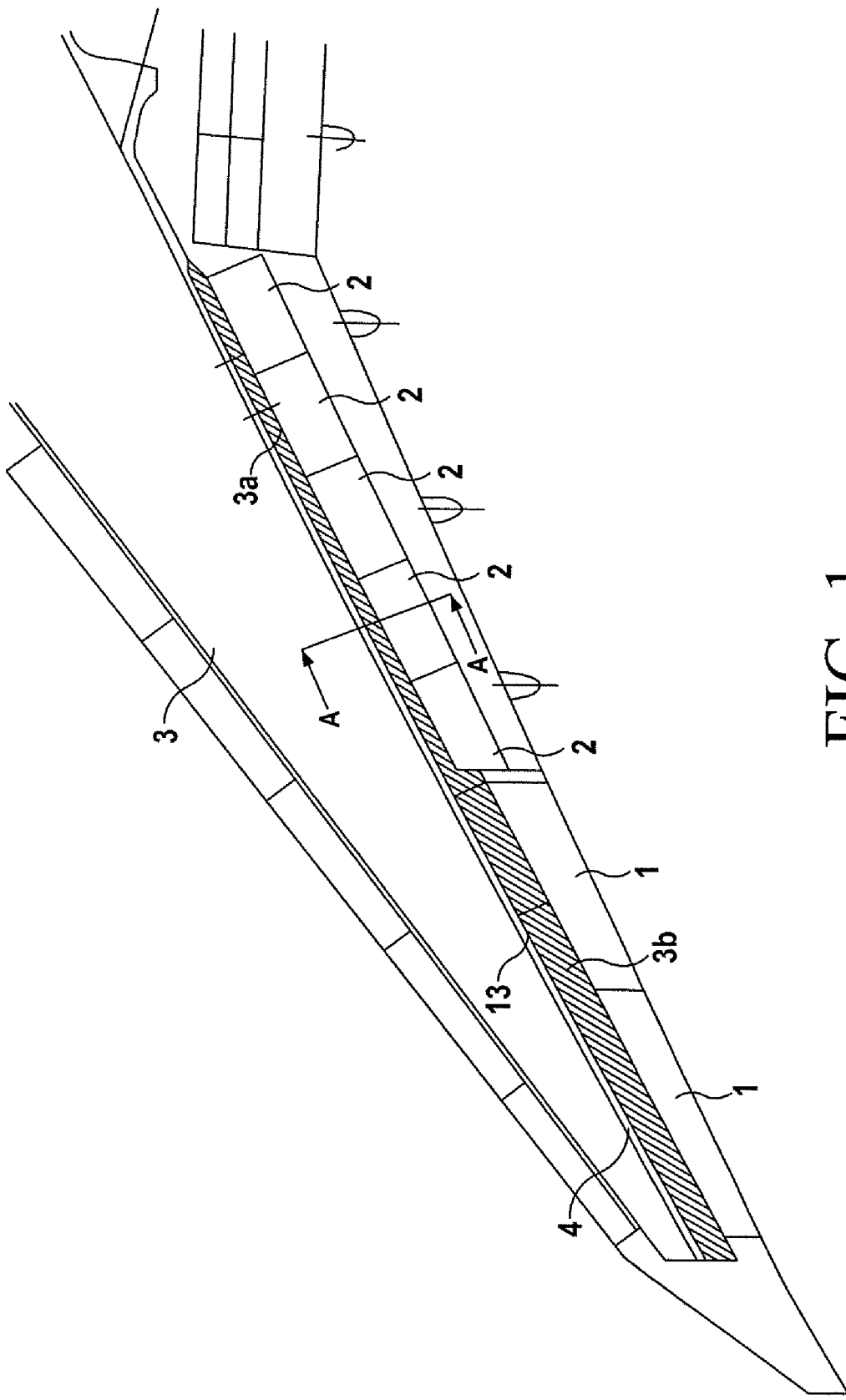
FIG. 1 is a plan view of the outboard part of an aircraft wing.
Figure 2:
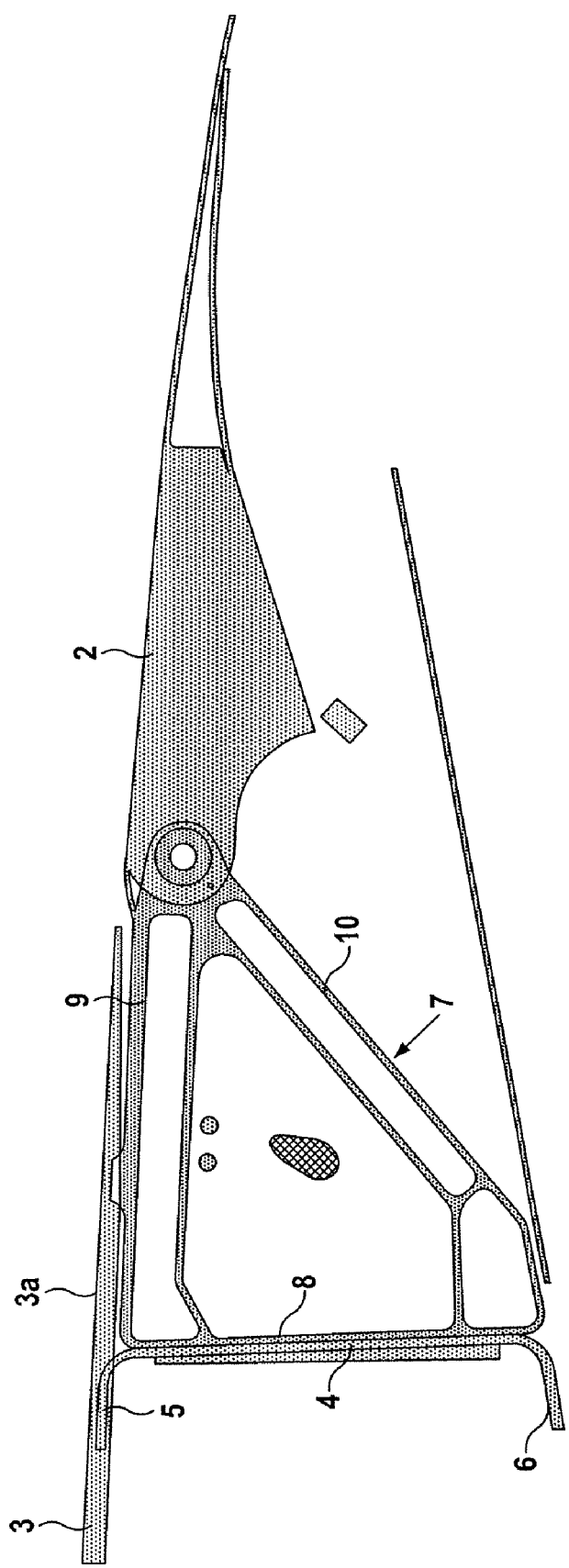
FIG. 2 is a cross-sectional view taken along a line A-A through one of the spoilers.

FIG. 1 is a plan view of the outboard part of an aircraft wing. The part of the wing shown in FIG. 1 has a composite upper cover 3 and a trailing edge carrying a pair of ailerons 1 and five spoilers 2. FIG. 2 is a cross-sectional view taken along a line A-A through one of the spoilers 2.

As shown in FIG. 2, the trailing edge of the wing comprises a C-section rear spar with a web 4 and upper and lower flanges 5, 6. The composite cover 3 is attached to the upper flange 5 and a lower cover (not shown) is attached to the lower flange 6. A variety of types of composite material may be used, but most typically the covers are formed from a laminar composite material, each ply comprising a set of unidirectional carbon fibres impregnated with an epoxy resin matrix. The cover 3 extends forward of the spar to form the upper boundary of the wing box. The cover also extends aft of the spar web to form an overhanging portion 3a shown in FIG. 2, and referred to below as a "cover overhang". A line of hinge ribs 7 (one of which is shown in FIG. 2) pivotally connect the spoiler 2 to the cover overhangs and to the spar web 4.

The hinge rib 7 comprises a base 8; an upper hinge rib arm 9 and a lower hinge rib arm 10 which extends longitudinally at an acute angle to the upper hinge rib arm to form a so-called "A-frame" shape. The upper hinge rib arm 9 is connected along its length to the cover overhang 3a by fasteners (not shown) and the base 8 is connected to the spar web 4 by fasteners (not shown). The foot of the lower hinge rib arm 10 is connected to a lower cover overhang (not shown).

The upper and lower hinge rib arms 9, 10 may be formed from a metallic material, such as aluminium or an aluminium alloy. Alternatively, they may be formed from a composite material, in which case the hinge rib arms 9, 10 may simply be bonded to the cover overhang 3a and the spar web 4 respectively rather than using fasteners.

The arms 9,10 meet at a hinge point where the hinge rib is pivotally mounted to the spoiler 2 at a clevis joint.

The upper cover 3 is extended to significantly overhang the spar web 4 to its rear, eliminating the requirement for a separate panel. This is beneficial as it decreases the complexity and overall part count of the wing. The difference in planform area between a conventional cover overhang and the cover overhang 3a is shown in FIG. 1. FIG. 1 shows the spar web 4 and a line 13 marking the trailing edge of a conventional cover overhang. In contrast, the cover overhang 3a extends further into an area indicated with hashed lines in FIG. 1.

To reduce the weight of the wing, the cover overhang 3a is ramped down in thickness in a chord-wise direction aft of the rear spar web 4 as shown in FIG. 2.

Figure 3:
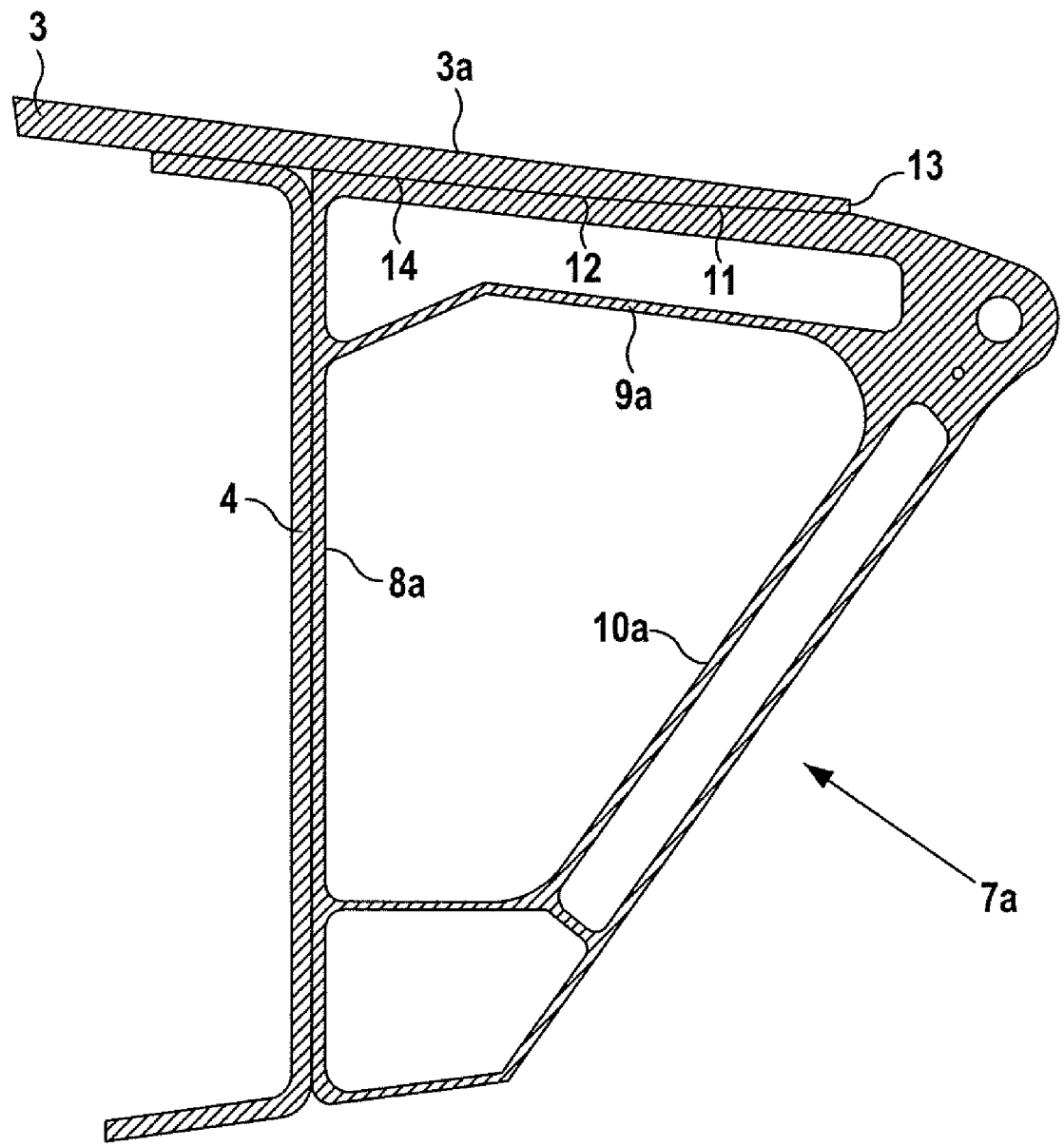
FIG. 3 is a cross-sectional view of an alternative spoiler hinge rib.

FIG. 3 is a sectional view through a hinge rib 7a similar to the hinge rib 7, showing a slightly different ramping profile in the cover overhang 3a. The hinge rib 7a comprises a base 8a; an upper hinge rib arm 9a and a lower hinge rib arm 10a. The upper hinge rib arm 9a is connected along its length to the cover overhang 3 by fasteners (not shown) and the base 8a is connected to the spar web 4 by fasteners (not shown).

The ramp 11 in the cover overhang 3a starts at a point 12 approximately mid way between the spar and the trailing edge 13 of the cover, and extends back as far as the trailing edge 13. In front of the ramp 11 there is an area 14 where the cover overhang has an approximately constant thickness.

Figure 4:
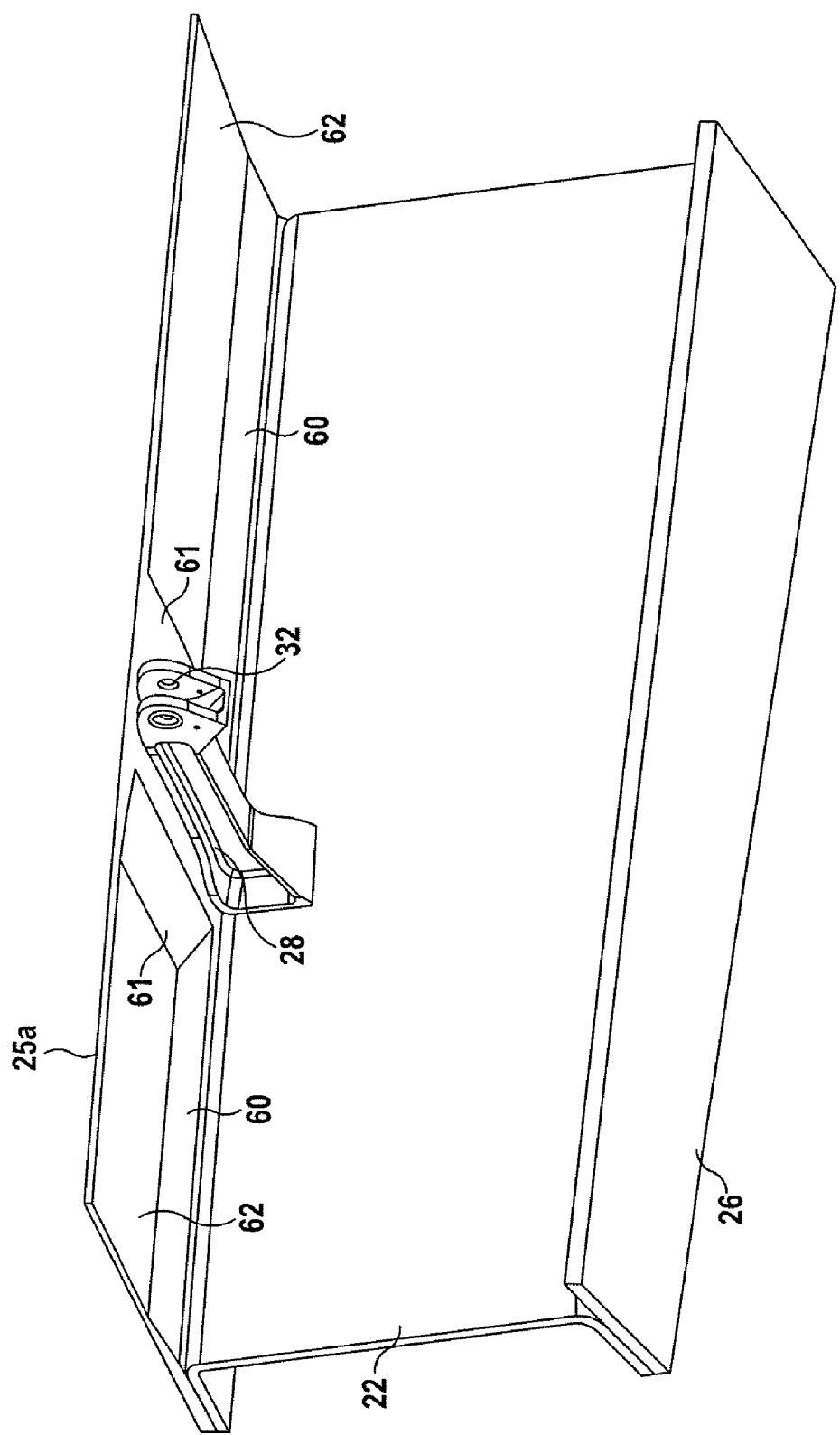
FIG. 4 shows a hinge rib arm installed in an alternative wing with a ramped composite upper cover.

FIG. 4 shows a hinge rib arm 28 installed in an alternative wing with a ramped composite upper cover 25a. A variety of types of composite material may be used, but most typically the cover 25a is formed from a laminar composite material, each ply comprising set of unidirectional carbon fibres impregnated with an epoxy resin matrix. The arm 28 pivotally couples a spoiler (not shown) to the trailing edge of the wing via a clevis 32.

Note that the hinge rib arm 28 may be used in isolation, as shown in FIG. 4. That is, the hinge rib may be attached to the composite cover 25a but not to the lower cover 26. Alternatively a rod (not shown) may be pivotally attached to the distal end of the hinge rib arm 28 and couple loads into the lower cover 26. Alternatively a more conventional A-frame hinge rib (not shown) may be used to pivotally connect the spoiler to the main wing element.

In the case where the hinge rib arm 28 is used in isolation, as shown in FIG. 4, then the arm 28 may be formed from the same composite material as the composite cover 25a and either:

bonded to the cover overhang 25a rather than using fasteners;

formed as a separate part as the cover 25a and then co-cured to the cover 25a; or formed integrally with the cover 25a.

The upper cover overhang 25a includes ramps 60 along which the cover thickness reduces in a rearward chord-wise direction away from the spar web 22, and a pair of ramps 61 along which the cover changes in thickness in a span-wise direction parallel with the rear spar. The ramps 60,61 are each formed by a series of terminating plies of the laminar composite.

The hinge rib arm 28 is attached to the relatively thick ridge in the cover 25a between the span-wise ramps 61. The cover 25a has substantially constant thickness along this ridge, and in the areas 62 between adjacent hinge ribs.

The arrangement of FIG. 4 optimises the structural integrity of the upper cover 25a where it is required to channel significant loads and reduces the weight of the cover 25a between the rib arms 28 where the extra strength is not required.

Figure 5:
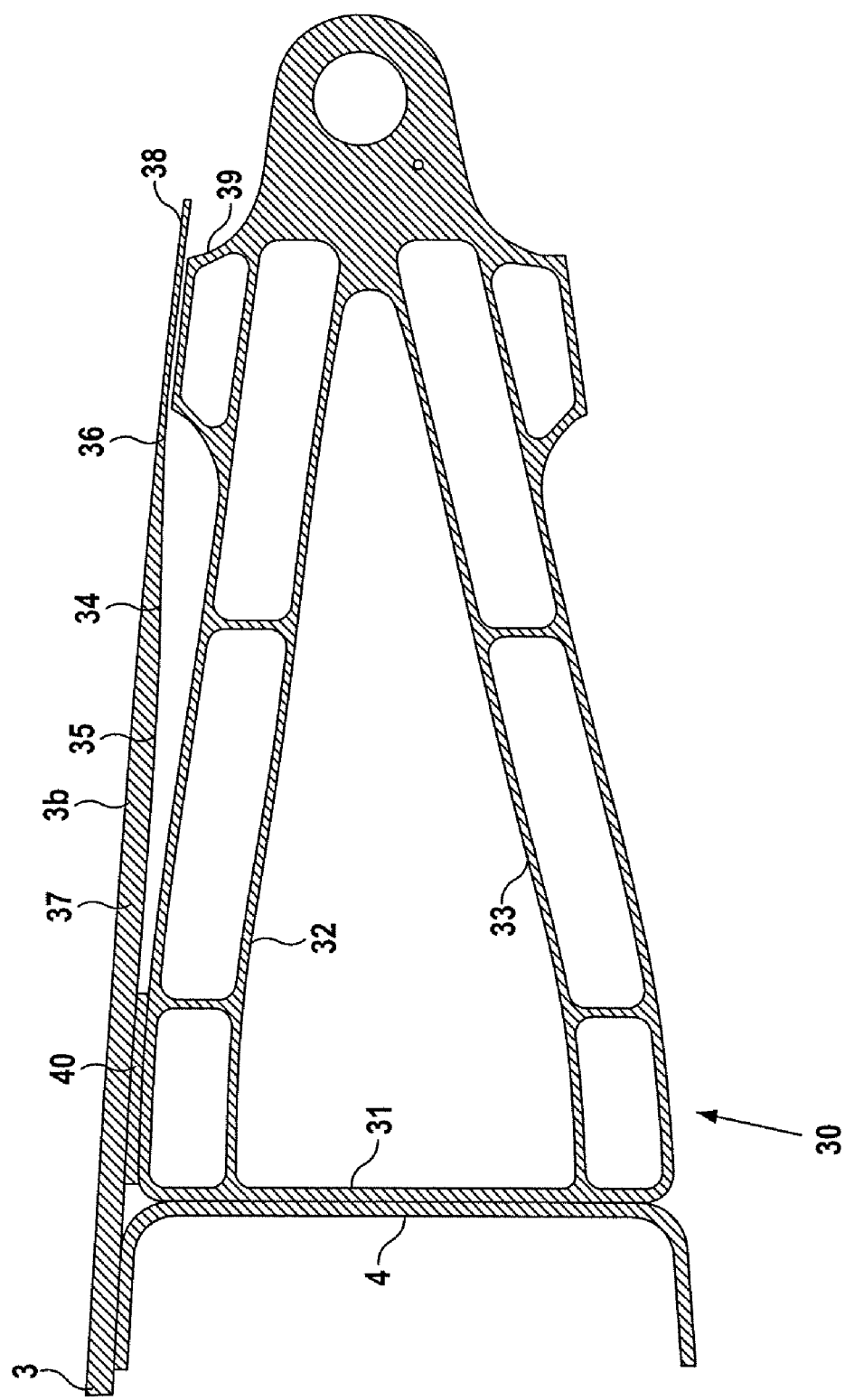
FIG. 5 is a cross-sectional view of an aileron hinge rib.

Although the hinge ribs described above are all used to attach a spoiler to the trailing edge of a wing, the invention is equally applicable to other control surfaces such as ailerons, elevators, rudder or spoilers. By way of example, FIG. 5 shows an aileron hinge rib 30 (similar in construction to the spoiler hinge rib 7a) for pivotally mounting an aileron 1 (shown in FIG. 1) to the trailing edge of the wing.

The aileron hinge rib 30 comprises a base 31; an upper hinge rib arm 32 and a lower hinge rib arm 33. The upper hinge rib arm 32 is connected to an overhanging portion 3b of the upper cover 3 by fasteners (not shown) and the base 31 is connected to the spar web 4 by fasteners (not shown).

A ramp 34 in the upper cover starts at a point 35 approximately mid way between the spar and the trailing edge of the cover, and extends back to a point 36. In front of the ramp 34 there is an area 37 where the cover has an approximately constant thickness and is attached to the arm 32 by fasteners (not shown) which pass through the cover, the arm 32 and a spreader plate 40. Behind the ramp 34 there is an area 38 where the cover has an approximately constant thickness and is attached to the arm 32 by fasteners (not shown) which pass through the cover 3 and a gusset plate 39 of the hinge rib.

The upper cover 3 is extended to significantly overhang the spar web 4 to its rear even further at the outboard end of the wing next to the ailerons 1 than at the inboard part next to the spoilers 2 The difference in planform area between a conventional cover overhang and the overhang 3b is shown in FIG. 1. The overhang 3b extends into an area indicated with hashed lines in FIG. 1.

Although the invention has been described above with reference to one or more preferred embodiments, it will be appreciated that various changes or modifications may be made without departing from the scope of the invention as defined in the appended claims.

The invention claimed is:

1. An aircraft structure comprising:
a rear spar; and
a composite cover attached to the rear spar and having an overhanging portion extending to its rear;
wherein the overhanging portion of the cover comprises one or more ramps along which the thickness of the cover reduces.

2. The structure of claim 1 wherein the thickness of the cover reduces along at least one of the ramps in a rearward chord-wise direction away from the rear spar.

3. The structure of claim 1 wherein the thickness of the cover reduces along at least one of the ramps in a span-wise direction parallel with the rear spar.

4. The structure of claim 1 wherein the overhanging portion of the cover further comprises an area having a substantially constant thickness.

5. The structure of claim 1 further comprising an aerodynamic control element pivotally attached to the rear spar.

6. The structure of claim 1 further comprising an aerodynamic control element; and a hinge rib which is attached to the overhanging portion of the cover and pivotally connected to the aerodynamic control element.

7. The structure of claim 6 wherein the hinge rib is attached to the area having a substantially constant thickness.

8. The structure of claim 6 further comprising a second cover which is attached to the rear spar and overhangs to its rear; and wherein the hinge rib is also attached to the overhanging portion of the second cover.

9. The structure of claim 8 wherein the hinge rib comprises a first hinge rib arm which is attached to the overhanging portion of the first cover; and a second hinge rib arm which is attached to the overhanging portion of the second cover.

10. The structure of claim 9 wherein the first hinge rib arm extends longitudinally at an acute angle to the second hinge rib arm.

11. An aircraft structure comprising:
a rear spar;
a composite cover which is attached to the rear spar and overhangs to its rear;
a second cover which is attached to the rear spar and overhangs to its rear;
a hinge rib which is attached to the composite cover but not to the second cover; and
an aerodynamic control element pivotally mounted to the hinge rib.

12. The structure of claim 11 wherein the hinge rib has a first portion in contact with the composite cover and a second portion in contact with the rear spar, and wherein the first portion has a larger surface area than the second portion.

13. The structure of claim 11 further comprising an aerodynamic control element, wherein the overhanging portion of the composite cover has a trailing edge which is closer to the aerodynamic control element than it is to the rear spar.

14. The structure of claim 11 wherein the composite cover is formed from a laminar composite.

15. The structure of claim 14 wherein at least one of the ramps in the composite cover is formed by a series of terminating plies of the laminar composite.

16. A method of transferring load from an aerodynamic control element into an aircraft structure, the aircraft structure comprising a rear spar, a composite cover which is attached to the rear spar and has an overhanging portion extending to its rear, and a hinge rib which is attached to the overhanging portion of the cover and pivotally connected to the aerodynamic control element, the method comprising transferring more load from the hinge rib into the overhanging portion of the composite cover than into the rear spar.

* * * * *